Sept. 15, 1931.   J. M. NAUL   1,823,555
ELECTRIC PHONOGRAPH MOTOR
Filed Oct. 11, 1930   3 Sheets-Sheet 1
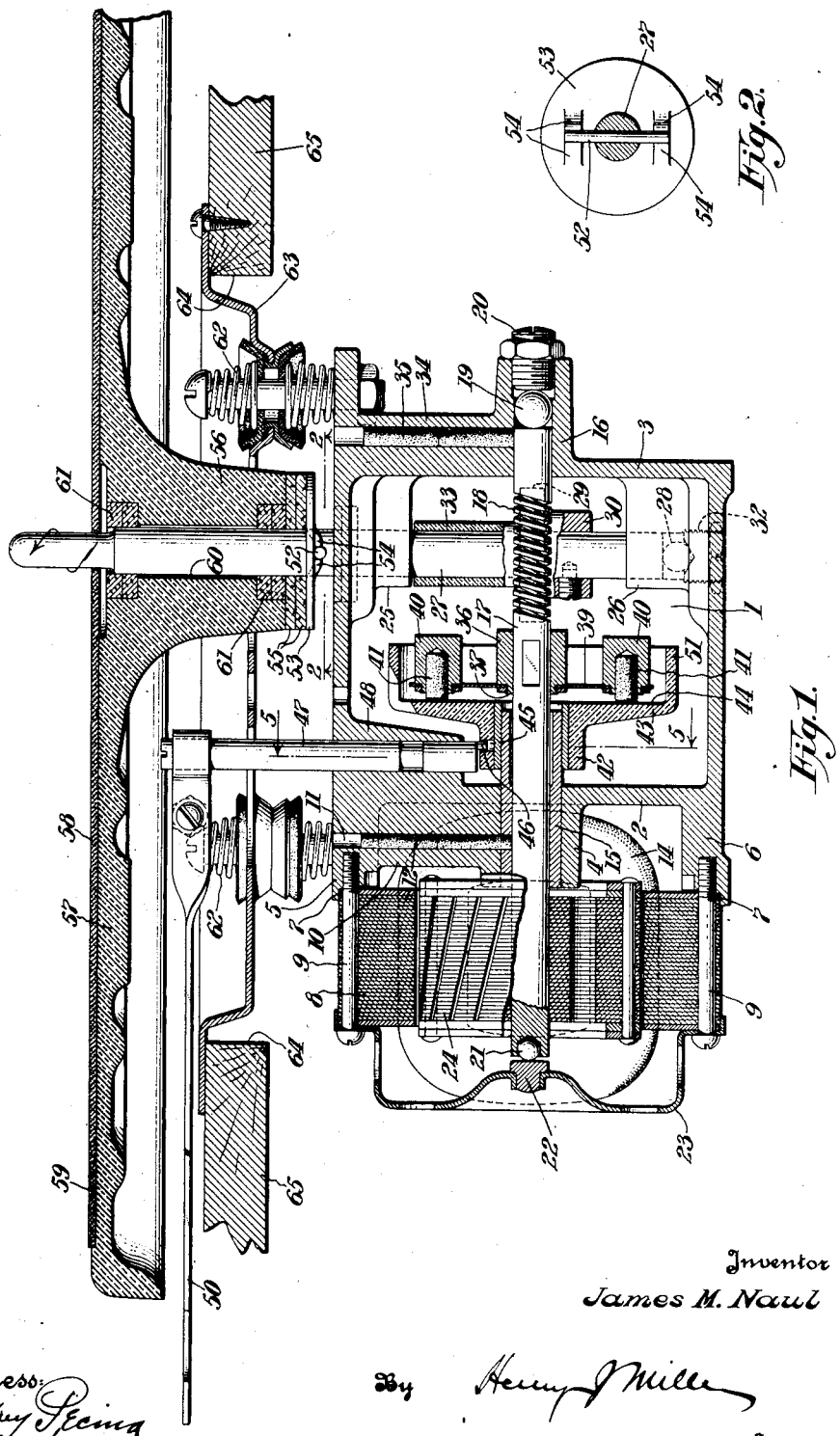
Inventor
James M. Naul
By Henry J Miller
Attorney
Witness:
Godfrey Lecing

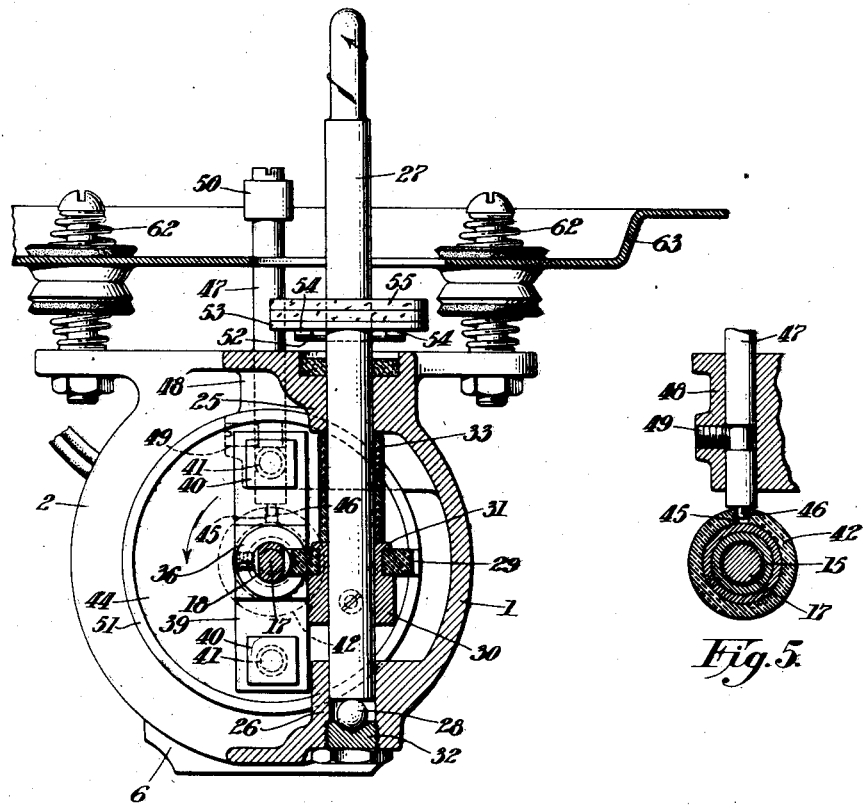

Sept. 15, 1931.   J. M. NAUL   1,823,555
ELECTRIC PHONOGRAPH MOTOR
Filed Oct. 11, 1930   3 Sheets-Sheet 3

Inventor
James M. Naul
By Henry J. Miller
Attorney

Witness:
Godfrey Secing

Patented Sept. 15, 1931

1,823,555

UNITED STATES PATENT OFFICE

JAMES M. NAUL, OF PLAINFIELD, NEW JERSEY, ASSIGNOR TO DIEHL MANUFACTURING COMPANY, OF ELIZABETH, NEW JERSEY, A CORPORATION OF NEW JERSEY

ELECTRIC PHONOGRAPH MOTOR

Application filed October 11, 1930. Serial No. 487,951.

This invention relates to electric phonograph motors and has for an object to provide a phonograph motor of improved and simplified construction and, particularly, of reduced overall length. Another object of the invention is to provide a phonograph motor with an improved speed-regulating mechanism.

With the above and other objects in view, as will hereinafter appear, the invention comprises the constructions, combinations and arrangements of parts hereinafter described and claimed.

Figure 7:
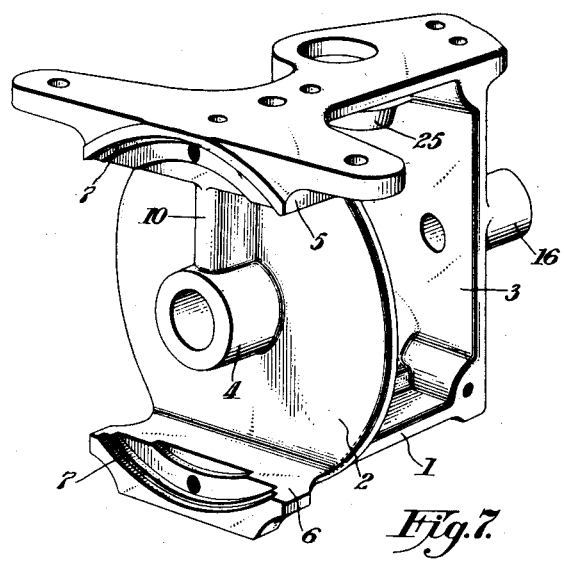
Figure 8:
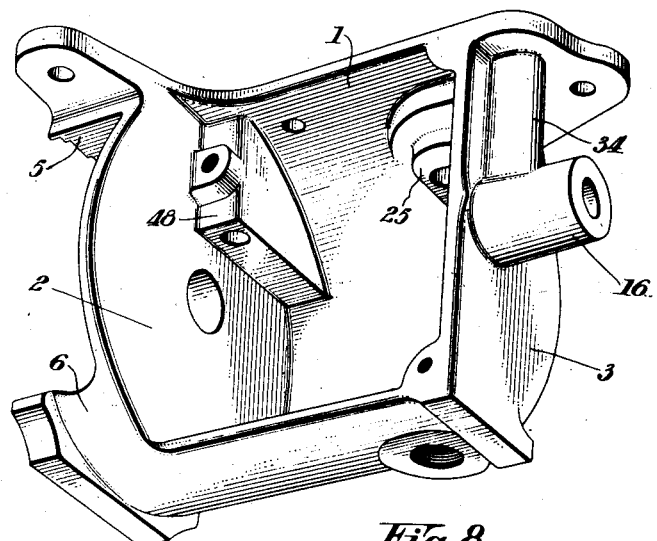

The features of the invention and the advantages attained thereby will be readily understood by those skilled in the art from the following detailed description of a preferred embodiment of the invention, taken in connection with the accompanying drawings, in which Fig. 1 is a longitudinal vertical section through the phonograph motor. Fig. 2 is a section on the line 2—2, Fig. 1. Fig. 3 is a transverse vertical section through the motor. Fig. 4 is a left end elevation of the motor shown in Fig. 1. Fig. 5 is a section on the line 5—5, Fig. 1. Fig. 6 is a detail view of the speed-governor bow-spring, and Figs. 7 and 8 are perspective views of the motor-frame member.

The frame comprises a semi-cylindrical trough-shaped element 1 turned on its side and closed at one end by a circular end-wall 2 and at its other end by a semi-circular end-wall 3. Projecting outwardly from the outer face of the circular end-wall 2 are the central bearing lug 4 and top and bottom motor-stator-supporting lugs 5 and 6, respectively. The lugs 5 and 6 are formed with circular seats 7 to which the motor-stator 8 is secured by the screws 9. The central bearing lug 4 and top plug 5 are connected by a vertical rib 10 in which is drilled an oil-duct 11 filled with wicking 12.

The stator 8 is formed from a stack of laminations and has four poles, p, two of which are disposed horizontally and two vertically. The poles p are each equipped with a shading coil 13 to provide a starting torque and the horizontally arranged poles only are embraced by the exciting coils 14 which are connected in series opposing relation; there being no exciting coils on the two vertical poles. As a result of this construction the length of the lugs 6 may be reduced until the exciting coils 14 nearly touch the end-wall 2; the rib 10 extending vertically between the two coils without interference. In other words, the exciting windings 14 and the vertical rib 10 overlap, as shown in Fig. 1.

Fitted in the bearing lug 4 is a bearing sleeve 15 one end of which projects into the trough 1 from the inner face of the end-wall 2 toward the end-wall 3. Journaled in the sleeve 15 and in the bearing lug 16 on the end-wall 3 is the motor-shaft 17 having cut therein the worm 18. A ball thrust bearing 19 and adjusting screw 20 are provided in the bearing lug 16 to take the end-thrust of the shaft 17 in one direction. The shaft 17 is apertured at its opposite and free end to receive a thrust ball 21, in position to bear upon the hardened steel thrust-button 22 which is pressed into an aperture in the center of the pressed sheet-metal end-cover 23 which is held in position upon the stator 8 by the screws 9. Mounted on the free end of the motor-shaft 17 is an ordinary squirrel-cage rotor 24.

The trough 1 is provided with internal bearing lugs 25, 26 for the vertical turntable shaft 27 which rests upon the ball step-bearing 28 and has fixed thereto a gear 29 meshing with the worm 18. The gear 29 preferably comprises a toothed disk of any well known non-metallic gear material fixed to a metallic hub 30 by being mounted on a reduced portion of such hub; the free end 31 of which reduced portion is spun over upon the gear-disk 29. The ball step-bearing 28 rests upon the adjusting screw 32. The fiber sleeve 33 surrounding the shaft 27 between the gear 29 and the top bearing lug 25, limits the upward adjustment of the shaft 27 by manipulation of the adjusting screw 32. The vertical member 3 has on its outer face above the bearing lug 16 a rib 34 which is drilled to receive the oil wick 35.

Mounted on the shaft 17 is a hub 36 the reduced and spun-over end 37 of which passes through the central aperture 38 in a flat bow-spring 39 to the ends of which are secured the weights 40 drilled to receive the friction pads 41. The weights 40 are disposed mainly on the right side face, Fig. 1, of the spring 39, so that the spring will be bowed toward the left by the centrifugal forces of the weights when the shaft 17 is running.

Slidably mounted on the projecting end of the sleeve 15 is the metal-bushed hub 42 of a disk 43 preferably of molded phenolic condensation material. The disk 43 surrounds the shaft 17 and has a circular face 44 which is wiped over by the pads 41 on the wiper-arms of the bow-spring 39. A device of this nature will hold the speed of the motor-shaft 17 substantially constant. The hub 42 of the disk 43 is apertured at 45 to receive the slightly smaller eccentric pin 46 on the lower end of the vertical shaft 47 journaled in a bearing lug 48 on the inner face of the circular end-wall 2 above the bushing 15. The screw 49, Fig. 5, prevents endwise movement of the shaft 47 but permits it to be turned by the indicator handle 50 clamped to its upper end. This arrangement provides for manual adjustment of the running speed of the motor by sliding the disk 43 on the sleeve 15 toward or away from the bow-spring member 39. The disk 43 is formed at its free edge with a cylindrical flange 51 which overhangs the weighted bow-spring member 39 and guards said arms against accidental contact by the fingers of the operator. Such flange also catches any oil-throw from the bearing sleeve 15 and bow-spring member 39.

The turntable shaft 27 carries a diametral pin 52 upon which rests a metal disk 53 having downwardly struck tongues 54 the ends of which engage the pin 52 and lock the disk to the shaft 27. Resting upon the disk 53 are cork washers 55 upon which rests the hub 56 of the turntable 57 preferably molded in one piece from phenolic condensation material. The turntable 57 is faced with a layer of felt 58 which is cemented to the slightly depressed upper face 59 of the turntable. The shaft aperture 60 in the hub 56 is appreciably larger than the shaft 27, so as not to touch the latter. At the upper and lower ends of the hub 56, the shaft aperture 60 is enlarged to receive the cork bushings 61 which snugly fit the shaft 27 and hold the upper face of the turntable truly perpendicular to the axis of the turntable shaft. The purpose of the cork bushings is to prevent transmission of any magnetic hum or gear noise to the turntable which is inclined to act as a resonator of any sound transmitted to it. The specific nature of the present turntable construction is, however, not a part of the present invention and no claim is herein made to the turntable per se or the manner of mounting it on the turntable shaft.

The motor frame is suspended by the usual spring and bolt suspension elements 62 from the top-plate 63 which may be let into an aperture 64 in the usual top-board 65 of a housing case or cabinet.

Having thus set forth the nature of the invention, what I claim herein is:—

1. A phonograph driving motor comprising, a frame having spaced connected vertical members, a motor-shaft journaled in said members, a vertical turntable shaft journaled in said frame between said members, a worm-and-gear-connection between said shafts, a stationary governor-disk surrounding said motor-shaft between said vertical members, and centrifugally operated weighted arms mounted on said shaft between said disk and said worm-and-gear-connection, said arms being adapted to wipe over the face of said disk.

2. An electric phonograph motor comprising, a frame formed with connected spaced vertical members, a bearing-sleeve fixed in one of said members and having one of its ends projecting toward the other of said members, a motor-shaft free at one end and journaled between its ends in said bearing sleeve, the other end of said motor-shaft being journaled in said other of said members, a rotor mounted on the free end of said motor-shaft, a stator fixed to said frame and embracing said rotor, a speed-governor disk adjustably mounted on the projecting end of said bearing sleeve, a centrifugal device fixed to said motor-shaft and having weighted arms adapted to wipe circularly over the face of said disk, a vertical turntable shaft journaled in said frame between said vertical members, and a worm-and-gear-connection between said motor-shaft and turntable shaft.

3. A phonograph driving motor comprising, a frame, a turntable shaft journaled vertically in said frame, a motor-shaft journaled horizontally in said frame, a worm-and-gear-connection between said shafts, a centrifugal member mounted on the motor-shaft and including weighted wiper-arms, a disk carried by said frame independently of the motor-shaft and surrounding the latter, said disk being shiftable longitudinally of the motor-shaft and being frictionally engaged by said wiper-arms when the motor-shaft is running, a manually operated speed-regulating shaft journaled in said frame parallel to said turntable shaft, and an eccentric element on the lower end of said speed-regulating shaft connected to shift said disk.

4. A phonograph driving motor comprising, a frame, a motor-shaft bearing sleeve mounted horizontally in said frame and having a projecting free end, a stationary disk slidably mounted on the projecting free end of said bearing sleeve, a motor-shaft journaled in said bearing sleeve, a centrifugal device mounted on the motor-shaft and including weighted spring-arms adapted to wipe against the face of said disk, said disk having at its rim a cylindrical flange overhanging said face and said spring-arms, a turntable-shaft journaled vertically in said frame, and a worm-and-gear-connection between said shafts.

5. A phonograph driving motor comprising, a frame in the form of a semi-cylindrical trough turned on its side, a circular end-wall closing one end of said trough, a semi-circular end-wall closing the other end of said trough, motor-stator supporting lugs projecting outwardly from the outer face of said circular end-wall, a motor-stator seated upon said lugs, a motor-shaft journaled in said end-walls and extending longitudinally of said trough, a rotor mounted on said motor-shaft, a turntable shaft journaled transversely of said trough, a worm-and gear-connection between said shafts, and a centrifugal speed-governor associated with the motor-shaft within said trough and between said circular end-wall and said worm-and-gear-connection.

6. A phonograph driving motor comprising, a frame including a thin vertical wall, a central bearing lug and top and bottom motor-stator-supporting lugs projecting outwardly from one side face of said vertical wall, a vertical rib connecting said bearing lug and said top motor-stator-supporting lug, said rib being formed with an oil-duct, a motor-shaft journaled in said bearing lug, a rotor on said shaft adjacent the free end of said bearing lug, a four-shaded-pole stator embracing said rotor and seated upon said motor-stator-supporting lugs with two of said poles disposed horizontally and two vertically, a pair of exciting coils embracing the horizontally disposed poles, there being no coils embracing the vertical poles, said coils being disposed in close juxtaposition to said thin vertical wall and on opposite sides of said vertical rib, a turntable shaft journaled in said frame and an operative connection between said shafts.

7. A phonograph driving motor comprising, a frame including a thin vertical wall, a central horizontally apertured bearing lug projecting from one side face of said wall, a vertical bearing-lug projecting from the other side face of said wall above said bearing aperture, a bearing sleeve fixed in said horizontally apertured bearing lug and projecting below said vertical bearing lug, a disk having a hub slidably mounted on said sleeve and extending under said vertical bearing lug, said hub having an aperture in its upper side, a manually operated shaft mounted in said vertical bearing lug, an eccentric pin on the lower end of said shaft entering the aperture in the hub of said disk, a motor-shaft journaled in said sleeve, a vertical turntable shaft journaled in said frame, an operative connection between said shafts, and a centrifugal device mounted on said shaft and including wiper-arms adapted to engage said disk.

8. A phonograph driving motor comprising, a frame, a vertical turntable shaft journaled in said frame, a vertical speed-regulating shaft journaled in said frame adjacent the turntable shaft, an eccentric member on the lower end of said speed-regulating shaft, a horizontal motor-shaft journaled in said frame below the lower end of said speed-regulating shaft, an operative connection between the motor and turntable shafts, a centrifugal speed-governor including weighted wiper-arms mounted on the motor-shaft and a disk disposed transversely of and surrounding the motor-shaft in position to be engaged by said wiper-arms, said disk being mounted on said frame independently of the motor-shaft to slide lengthwise of the motor-shaft, and an operative connection between said eccentric member and said disk.

In testimony whereof I have signed my name to this specification.

JAMES M. NAUL.